July 20, 1926.  1,592,899
G. S. NISSEN
NONGLARE HEADLIGHT
Filed Jan. 21, 1926
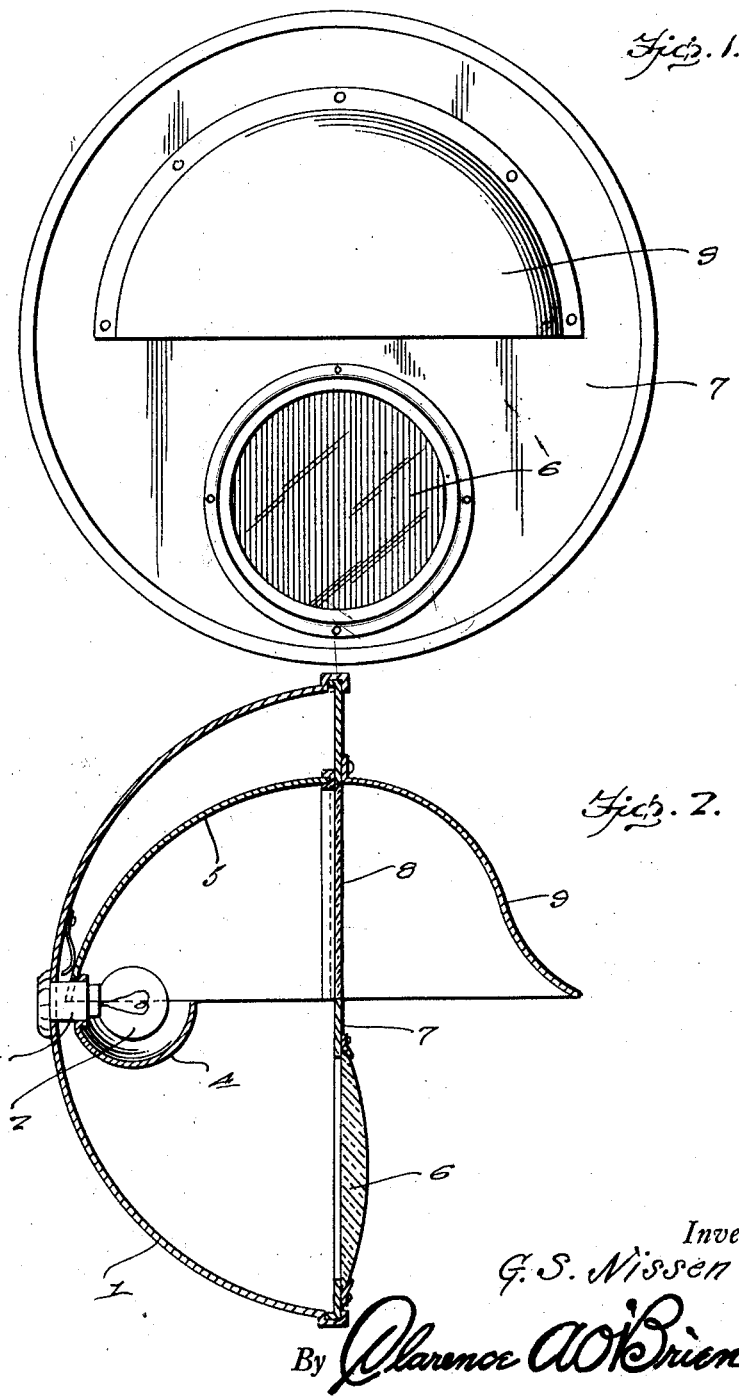
Inventor
G. S. Nissen
By Clarence A. O'Brien
Attorney Patented July 20, 1926.

1,592,899

UNITED STATES PATENT OFFICE.

GEORGE S. NISSEN, OF KANSAS CITY, MISSOURI.

NONGLARE HEADLIGHT.

Application filed January 21, 1926. Serial No. 82,720.

My present invention pertains to headlights constructed to adequately illuminate the roadway in front of an automobile while avoiding the throwing of glare in the eyes of an approaching motorist or pedestrian; and it consists in the peculiar and advantageous headlight hereinafter described and definitely claimed.

In the accompanying drawings, forming part of this specification:—

Figure 1 is a front elevation of the headlight constituting the best practical embodiment of my invention of which I am cognizant.

Figure 2 is a vertical central section of the same.

Similar numerals of reference designate corresponding parts in both views of the drawings.

My novel headlight among other elements comprises a casing 1 of the general shape illustrated, equipped for the mounting therein of an incandescent electric lamp 2. Mounted on the socket of the lamp 2 is a collar 3, and carried by said collar and disposed below the lamp 2 is a concavo-convex reflector 4 which is designed to serve the twofold purpose of directing light upwardly against a reflector 5 while at the same time dimming the illumination of a lower lens 6 which may be and preferably is colored, and may be either transparent or translucent in the discretion of the manufacturer and the party to use the headlights.

The lens 6 is designed to attract the attention of approaching automobilists and pedestrians so that they will be put on notice regarding the proximity of the automobile equipped with my novel headlight, and it will be readily understood that the said lens 6 is carried by an opaque plate 7 which constitutes the front wall of the casing 1 and is appropriately connected in fixed relation to said casing 1. The reflector 5 is interposed between and supported by the collar 3 and the plate 7 and is located in the upper portion of the casing 1 and is spaced from the wall of the said casing 1 as appears in Figure 2.

Disposed in front of and located in the same horizontal plane as the reflector 5 is a pane of clear glass 8 or other appropriate transparent material; the said pane being appropriately secured in and carried by the plate 7 as clearly shown in Figure 2.

Also carried by and fixed with respect to the plate 7 is a hood or shield 9; said hood or shield 9 overhanging the pane of glass 8 and the lens 6, and also resting at opposite sides of the pane of glass 8 so that the light projected through the said pane of glass 8 will be deflected downwardly with the result that the road in front of the automobile would be adequately illuminated, but the throwing of any glare in the eyes of an approaching motorist or in the eyes of a pedestrian will be absolutely averted.

It will be appreciated from the foregoing that notwithstanding the practical advantages ascribed to my novel headlight, the headlight as a whole is simple and inexpensive in construction, is efficient for the purposes stated, and is well adapted to withstand the usage to which headlamps or headlights of automobiles are ordinarily subjected.

As hereinbefore stated the construction illustrated and described herein constitutes the best practical embodiment of my invention of which I am aware, and I therefore prefer such construction. I do not desire, however, to be understood as limiting myself to the precise construction and relative arrangement of the parts embraced in the illustrated headlight, my invention being defined by my appended claims within the scope of which changes in structure and in relative arrangement may be made without departure from my invention.

Having described my invention, what I claim and desire to secure by Letters Patent, is:—

1. A headlight comprising a casing, a central lamp therein, a reflector arranged below and adjacent to the lamp, an upper reflector disposed above the lamp and spaced from the wall of the casing, an opaque plate carried in and closing the front of the casing and equipped below its horizontal center with a lens and also equipped above its horizontal center with a pane of transparent material, said pane of transparent material corresponding in shape and size to the forward portion of the second-named reflector, and a hood or shield carried by and disposed in front of the opaque plate and resting above and at opposite sides of the pane of transparent material and adjacent thereto; said hood or shield overhanging said pane of transparent material and also overhanging said lens.

2. A headlight comprising a casing, a central lamp therein, a reflector arranged below and adjacent to the lamp, an upper reflector disposed above the lamp and spaced from the wall of the casing, an opaque plate carried in and closing the front of the casing and equipped below its horizontal center with a lens and also equipped above its horizontal center with a pane of transparent material, said pane of transparent material corresponding in shape and size to the forward portion of the second-named reflector, and a hood or shield carried by and disposed in front of the opaque plate and resting above and at opposite sides of the pane of transparent material and adjacent thereto; said hood or shield overhanging said pane of transparent material and also overhanging said lens, and the first-named reflector being of concavo-convex form and being disposed below the horizontal center of the casing and the lamp.

3. A headlight comprising a casing of concavo-convex form, an opaque plate carrried by said casing and closing the forward portion thereof, a lamp in the center of the casing, a lens carried in said plate and located in the lower portion of the headlight, a transparent plate carried by said opaque plate and disposed in the upper portion of the said light, a reflector arranged in the casing and disposed above the lamp, and a hood or shield arranged above and at opposite sides of the transparent plate and also above the lower portion of the headlight and adapted to throw the light downwardly and avoid glare.

In testimony whereof I affix my signature.

GEORGE S. NISSEN.